W. C. CORNWELL.
SHOCK ABSORBER.
APPLICATION FILED JAN. 16, 1913.

1,112,771.

Patented Oct. 6, 1914.

United States Patent Office.

WILLIAM C. CORNWELL, OF CINCINNATI, OHIO.

SHOCK-ABSORBER.

1,112,771.

Specification of Letters Patent.

Patented Oct. 6, 1914.

Application filed January 16, 1913. Serial No. 742,374.

*To all whom it may concern:*

Be it known that I, WILLIAM C. CORNWELL, a citizen of the United States, residing at Cincinnati, in the county of Hamilton and State of Ohio, have invented certain new and useful Improvements in Shock-Absorbers, of which the following is a specification.

This invention relates to shock absorbers. Under ordinary riding conditions, automobile supporting springs are supposed to withstand all undue downward tendency toward compression but, when the body is jolted upwardly by virtue of the rebound or recoil of unduly compressed springs, there is a tendency of the body and its springs to move downwardly below normal position.

It is therefore one object of my invention to provide a shock absorber embodying such characteristics as to limit undue downward movement of the vehicle body and its springs by frictionally resisting the upward movement of the springs above normal and thereby automatically control undue downward movement of the springs by controlling the degree of rebound or recoil of the same.

Another object is to provide a shock absorber embodying such characteristics that the supporting springs of the vehicle may be compressed under their normal resiliency and on the rebound or recoil frictionally resisted to prevent jolting or undue vibration incident to the recoil of the springs.

Another object is to provide a shock absorber operable to act quickly and effectively upon the vehicle striking an obstruction or uneven surface in the roadway and adapted to remain idle or inactive when the vehicle is riding over even roads or pavements.

Another object resides in the provision of a shock absorber wherein there cannot be such excesss friction as to cause the car to ride hard and wherein there is not such friction interposed between the springs and the body as will resist the downward deflection of the springs to the extent of transmitting the shock incident to the rebound or recoil of compressed springs to the tires and other parts of the vehicle.

A still further object resides in the provision of a shock absorber whose power or resistance may be determined accurately without removing the absorber from its position on the vehicle and without the necessity of permanently securing an indicator to the absorber.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings: Figure 1 is a side elevation of the invention in one of its applications to a motor car or other vehicle. Fig. 2 is a detailed view of the intermediate friction disk and its arm. Fig 3 is an enlarged side elevation of the absorber detached from it mountings. Fig. 4 is a top plan view partly in horizontal section.

Referring now more particularly to the accompanying drawings, the reference character 5 indicates a portion of an automobile or other vehicle frame, and 6 indicates a portion of one of the vehicle frame supporting springs.

The characters 7 and 8 indicate ratchet disks, and 9 designates an intermediate disk. Interposed between the intermediate and ratchet disks and preferably situated in recesses 10 formed in the inner faces of the ratchet disks are wood or other fibrous friction disks 11 and 12. The ratchet disks 7 and 8 have trunnions 13 and 14 projecting from their outer faces and all of the disks have central alining apertures by which they are all loosely journaled on an axis or bolt 15. The intermediate disk 9 has an arm 16 rigid therewith and projecting therefrom and whose outer end is provided with an aperture 17 so that it may be readily secured rotatively to the clip 18 on the spring 6.

As has been stated, the intermediate disk 9 has connection with the spring 6 with all of the disks mounted upon a common axis. The outer or ratchet disks 7 and 8 have connection with a portion of the frame 5 by means of an upper arm A. In this particular embodiment of my invention the upper arm A preferably consists of spaced members 19 and 20 whose outer ends are preferably brought together and provided with an aperture 21 to rotatably receive a bolt 22 secured in the bracket 23 depending from the part 5 of the frame of the vehicle. The inner ends of these members 19 and 20 of the upper arm A are preferably journaled on the trunnions 13 and 14 of the respective ratchet disks 7 and 8, and thereby in effect journaled on the common axis 15. The bolt 15 is preferably provided with a head 24 at one end with its opposite end preferably screw threaded to receive a nut 25 movable thereon toward and away from the head 24. Disposed on the bolt 15 between the head 24 and the nut 25 and against the outer faces of the members 19 and 20 and also against the trunnions 13 and 14 of the ratchet disks 7 and 8, are washers 26 and 27. Each washer 26—27 is preferably provided with an annular groove 28 and each ratchet disk 7 and 8 is provided with an annular groove 29 in which grooves I preferably dispose suitable packing for the purpose of excluding sand, dirt, or other foreign matter from between these parts and from the axis 15. By the manipulation of the nut 25 on the bolt 15 toward and away from the head 24 of the bolt, the friction between the disks may be varied and, if desired, a cotter pin or other suitable fastening element 30 may be employed to hold the nut on the bolt against accidental displacement or loosening. If desired and preferably, a spring or other yieldable element 31 may be interposed between the nut 25 and the washer 27 so that the disks may be yieldingly held frictionally together.

When the vehicle strikes an obstruction or deep rut in the roadway the supporting springs and the frame move toward each other, compressing the springs. The rebound or recoil of the springs gives greater jar or jolt to the vehicle and its occupants than the initial compression of the springs. I therefore mount all of the disks loosely on a common axis 15 so that when the arms A and 16 approach each other there is little or no friction between the disks and the springs 6 retain their natural resiliency and are thereby not restrained by the absorber. As the rebound or recoil gives the greater jolt I provide means to coöperate with the ratchet disks 7 and 8 so that the arm A forces the ratchet disks to rotate on their axis against frictional resistance of the intermediate disk 9 and the interposed fibrous disks 10 and 11. One means for this purpose resides in a pawl 32 swingingly mounted on a pivot 33 secured to the spaced members 19 and 20 of the upper arm A and which, in the particular embodiment of invention illustrated, is preferably of a width substantially equal to the space between the members 19 and 20 so that its outer end may engage the teeth of both ratchet disks 7 and 8. This pawl 32 is preferably spring pressed so that it may be maintained normally in operative engagement with the ratchet disks so as to act quickly on the rebound of the vehicle springs. For this purpose any suitable character of spring or other suitable element may be employed. As shown, a spring 34 is engaged at its ends with the members 19 and 20 of the upper arm A with its bight portion 34' extending over the pawl and to give this spring tension, its legs 34ª may be directed beneath the nuts 35 on the ends of the aforesaid pivot 33. This type of spring, however, is immaterial so long as the pawl is held normally yieldable in engagement with the ratchet disks.

As clearly shown in Fig. 3 the absorber parts are so assembled that the pawl has play between the teeth of the ratchet disks so that when the vehicle is running over comparatively even roads or pavements, the shock absorbers remain inactive, in that ordinary running does not depress the springs below their normal position and, under such conditions, the springs themselves possess the requisite resiliency to insure smooth riding of the vehicle and not requiring the addition of a restraining element. Yet, in the event of excessive vibration or jolt, the shock absorbers immediately become active and effectively resist the rebound and restrain the upward movement of the frame to prevent violent upward movement of the body of the vehicle to the discomfort and annoyance of the occupants of the vehicle. This is brought about because, while running over comparatively even roads the engaging end of the pawl 32 has play between the teeth as indicated in dotted lines in Fig. 3 and immediately upon the vehicle coming in contact with a rough surface in the road, the pawl 32 engages the corresponding teeth of the ratchet disks at the first depression of the springs, and forces the latter to rotate on the recoil of the springs against the frictional resistance of the disks interposed between them, thereby taking up and resisting the jar.

The frictional resistance necessary to overcome the rebound of springs varies. To gage the frictional resistance between the disks, the present shock absorber is so constructed that this may be determined without removing the absorber from the vehicle and without complicating the device with indicating devices, which, at best, are not accurate, especially after continued use. In the present instance, the amount of resistance between the disks may be accurately ascertained without the permanent connection of an indicating device and without removing the shock absorber from its operative position and while the shock absorber is inactive. One way in which the amount of resisting or restraining power of the shock absorber may be ascertained is by the application to the ratchet wheels of a spanner wrench or other suitable device (not shown) for the purpose of rotating the ratchet disks and measuring the force required to rotate the ratchet disks by the employment of suitable scales or weights (not shown) connected to the spanner wrench or other device used for rotating the disks.

Under ordinary riding conditions the automobile supporting springs withstand all undue downward tendency toward compression but, when the body is jolted upwardly by virtue of the rebound of unduly compressed springs, there is a tendency of the body to move downwardly below normal position. By restraining the movement of the body above normal I equalize the downward movement thereof notwithstanding the fact that the arms A and 16 approach each other freely because, the movement above normal being restrained, it equalized the movement below normal. I thereby automatically control undue downward movement of the springs by controlling the degree of rebound or recoil of the springs.

It is apparent from the foregoing and from the accompanying drawings that the present invention is comparatively simple and inexpensive of manufacture. The shock absorbers may be connected up in various ways with automobiles and as many may be employed as is necessary.

What is claimed is:

1. A shock absorber for vehicles comprising a plurality of ratchet disks, other disks interposed between the ratchet disks, a common axis for all of the disks, an arm connected to one of the interposed disks, an arm including side members journaled on said axis adjacent the ratchet disks, and a pawl carried by the spaced members of said second-mentioned arm for engagement with both of said ratchet disks to rotate both ratchet disks against the frictional resistance of the interposed disks when the second arm is spread away from the first-mentioned arm.

2. A shock absorber for vehicles comprising a plurality of disks including a plurality of ratchet disks, one of the disks having an arm projecting therefrom, a common axis for all the disks, a second arm journaled on said axis and movable toward and away from the first-mentioned arm, and a spring pressed pawl carried by the second mentioned arm for engagement with said ratchet disks to rotate the latter against the frictional resistance of the other disks when said arms are spread apart.

3. A shock absorber for vehicles comprising a plurality of disks including a pair of ratchet disks, a common axis for the disks on which they are loosely journaled, an arm connected to one of the disks, an arm rotatably mounted adjacent one of the disks, a pawl carried by one of the arms to engage both of said ratchet disks to effect a rotation of the ratchet disk against frictional resistance of the other disks, and a compressible yieldable element mounted on the axis to vary the frictional resistance between the disks.

4. A shock absorber for vehicles comprising ratchet disks each having a depression on its inner side, fibrous disks mounted in the depressions of the ratchet disks, a metallic disk interposed between the fibrous disks and provided with a connecting arm, an axis common to all of said disks and on which all of the disks are journaled, the ratchet disks having outwardly directed trunnions, an arm including spaced members journaled on the trunnions of the ratchet disks, and a pawl carried by the second-mentioned arm for engagement with the ratchet disks to effect rotation of the ratchet disks against frictional resistance of the other disks when said arms are spread apart.

5. A shock absorber for vehicles comprising ratchet disks each having a depression on its inner side, fibrous disks mounted in the depressions of the ratchet disks, a metallic disk interposed between the fibrous disks and provided with a connecting arm, an axis common to all of said disks and on which all of the disks are journaled, the ratchet disks having outwardly directed trunnions, an arm including spaced members journaled on the trunnions of the ratchet disks, a pawl carried by the second-mentioned arm for engagement with the ratchet disks to effect rotation of the ratchet disks against frictional resistance of the other disks when said arms are spread apart, and means for yieldably varying the frictional resistance between the disks.

6. A shock absorber for vehicles comprising ratchet disks each having a depression on its inner side, fibrous disks mounted in the depressions of the ratchet disks, a metallic disk interposed between the fibrous disks and provided with a connecting arm, an axis common to all of said disks and on which all of the disks are journaled, the ratchet disks having outwardly directed trunnions, an arm including spaced members journaled on the trunnions of the ratchet disks, a pawl carried by the second-mentioned arm for engagement with the ratchet disks to effect rotation of the ratchet disks against frictional resistance of the other disks when said arms are spread apart, each of the members of the second arm having an annular groove surrounding the trunnion of the corresponding ratchet disk, and packing material in said groove.

7. A shock absorber for vehicles comprising ratchet disks each having a depression on its inner side, fibrous disks mounted in the depressions of the ratchet disks, a metallic disk interposed between the fibrous disks and provided with a connecting arm, an axis common to all of said disks and on which all of the disks are journaled, the ratchet disks having outwardly directed trunnions, an arm including spaced members journaled on the trunnions of the ratchet disks, a pawl carried by the second-mentioned arm for engagement with the ratchet disks to effect rotation of the ratchet disks against frictional resistance of the other disks when said arms are spread apart, each of the members of the second arm having an annular groove surrounding the trunnion of the corresponding ratchet disk, packing material in said groove, a spring on said axis and a nut operable on the axis to compress the spring and thereby vary the frictional resistance between the disks.

8. A shock absorber for vehicles comprising a plurality of disks including a pair of ratchet disks between which the remaining disks are interposed, one of the interposed disks having an arm projecting therefrom, a common axis for all of the disks, an arm including spaced members journaled adjacent the outer faces of the ratchet disks, and a spring operated pawl swingingly mounted between the spaced members of the second mentioned arm for engagement with both of the ratchet disks to effect rotation of both of the ratchet disks against frictional resistance of the interposed disks when said arms are spread apart.

9. A shock absorber for vehicles comprising a plurality of disks including a pair of ratchet disks between which the remaining disks are interposed, one of the interposed disks having an arm projecting therefrom, a common axis for all of the disks, an arm including spaced members journaled adjacent the outer faces of the ratchet disks, and a spring operated pawl swingingly mounted between the spaced members of the second mentioned arm for engagement with both of the ratchet disks to effect rotation of both of the ratchet disks against frictional resistance of the interposed disks when said arms are spread apart, said pawl normally having play between the teeth of both of said ratchet disks so as not to rotate the ratchet disks until after said arms have been moved together a predetermined distance.

In testimony whereof I affix my signature in presence of two witnesses.

WILLIAM C. CORNWELL.

Witnesses:
 Geo. C. Shoemaker,
 John H. Siggers.